United States Patent
Otto et al.

[15] 3,645,364
[45] Feb. 29, 1972

[54] SELF-ADJUSTING BRAKING APPARATUS

[72] Inventors: Alfred Otto, Remscheid; Horst Klassen, St. Sebastian, both of Germany; Daniel Steiner, Schaffhausen, Switzerland

[73] Assignees: Bergische Stahl-Industrie, Remscheid, Germany; Schweizerische Industrie-Gesellschaft, Neuhausen am Rheinfall, Switzerland

[22] Filed: June 10, 1969

[21] Appl. No.: 831,861

[30] Foreign Application Priority Data

June 11, 1968 Germany..................P 17 50 849.5

[52] U.S. Cl ............................188/196 D, 188/59, 188/202
[51] Int. Cl.........................................................F16d 65/66
[58] Field of Search .............................188/59, 71.8–71.9, 188/196 D, 198, 263 PL

[56] References Cited

UNITED STATES PATENTS 3,141,861 9/1964 Hodkinson......................188/196 D X
3,249,183 5/1966 Billeter...........................188/196 D X

*Primary Examiner*—Duane A. Reger
*Attorney*—Michael S. Striker

[57] ABSTRACT

A self-adjusting braking apparatus, particularly for rail-mounted vehicles, comprises two brakeshoes which are movable against opposite sides of a disk by two levers each of which has one end pivotally connected to a shoe. The other end of one of the levers is pivoted to the frame of the vehicle and the other end of the other lever is movable with reference to the other end of the one lever by a braking cylinder. A coupling device of infinitely variable length connects intermediate portions of the two levers so that the levers pivot with reference to the coupling device while the other end of the other lever is subjected to the action of the braking force whereby the shoes move toward the respective sides of the disk. The length of the coupling device is automatically reduced in response to engagement of a projection of the coupling device with an abutment provided on a third lever one end of which is connected to the one end of the other lever and the other end of which is pivoted to the frame. Shortening of the coupling device compensates for wear on linings of the brakeshoes.

19 Claims, 3 Drawing Figures

PATENTED FEB 29 1972  3,645,364
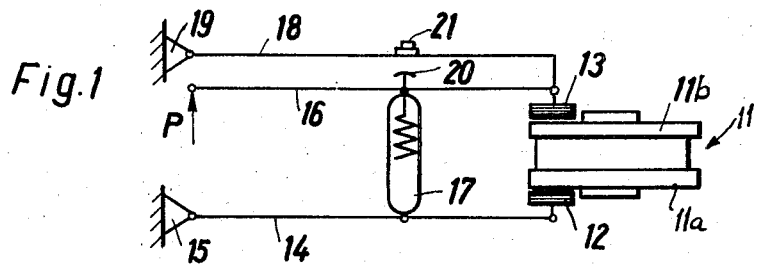
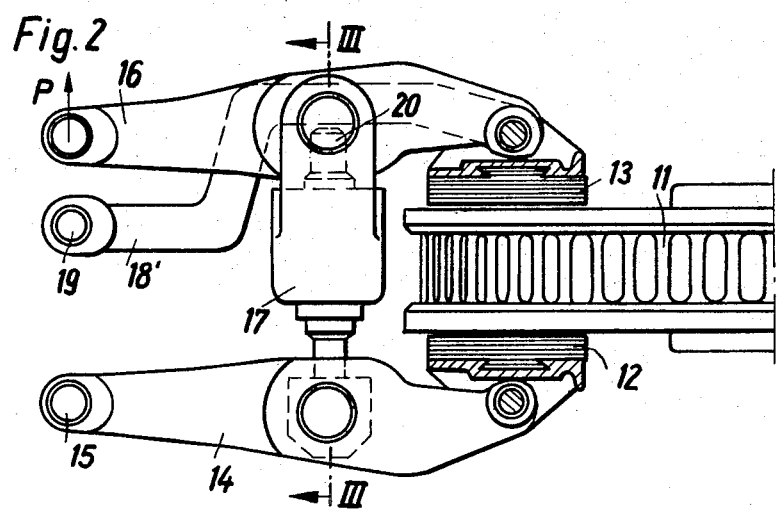
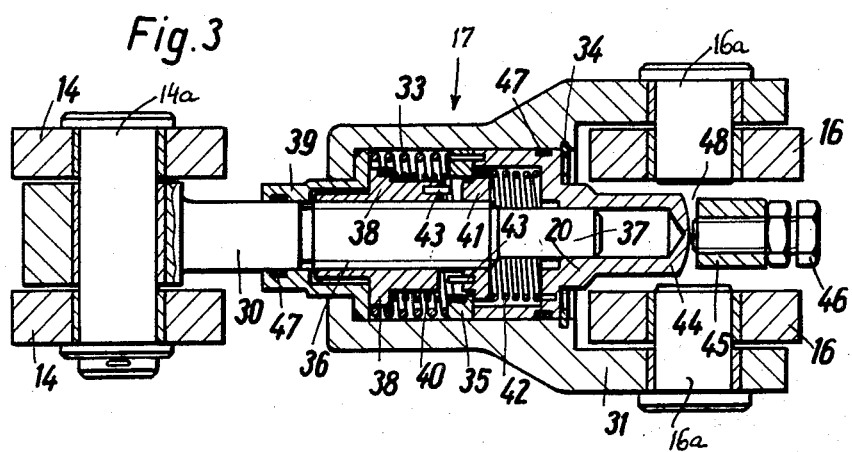
Inventors.
ALFRED OTTO
HORST KLASSEN
DANIEL STEINER
By: Michael S. Striker
Attorney 3,645,364

SELF-ADJUSTING BRAKING APPARATUS

BACKGROUND OF THE INVENTION

The present invention relates to braking apparatus in general, and more particularly to improvements in self-adjusting braking apparatus (i.e., apparatus which automatically compensate for wear on their friction generating parts) which are especially suited for use in rail-mounted vehicles.

Certain conventional self-adjusting braking apparatus comprise a braking cylinder whose piston rod is caused to change its effective length in order to compensate for wear on the linings of brakeshoes. This insures that the distance which the brakeshoes must cover to move their linings into engagement with the disk is constant. A drawback of such braking apparatus is that they comprise a large number of complicated parts and that the length of the cylinder is excessive, i.e., it is difficult to provide in a vehicle enough room to accommodate such self-adjusting apparatus. Certain more recent proposals include the provision of an adjustable bridge which is used in the linkage for the brakeshoes; however, such bridge is adjustable stepwise which is unsatisfactory because the clearance between the brakeshoes and the disk prior to application of the braking force is not constant.

SUMMARY OF THE INVENTION

An object of the present invention is to provide a braking apparatus which adjusts itself automatically in response to wear on the linings of its brakeshoes and which is capable of effecting an infinite number of adjustments.

Another object of the invention is to provide a reliable self-adjusting braking apparatus wherein the adjustment is effected at a point which is remote from the brake cylinder and which can insure that the clearance between the linings of brakeshoes and the disk remains constant when the apparatus is idle, regardless of the extent of wear on the linings.

A further object of the invention is to provide a novel infinitely adjustable and readily resettable coupling device for use in the above outlined braking apparatus and to design the coupling device in such a way that it can be installed in existing braking apparatus by necessitating only minor alterations in such apparatus.

An additional object of the invention is to provide a compact self-adjusting braking apparatus which comprises a relatively small number of parts and which is also adjustable by hand if the person in charge wishes to change the clearances between the linings of brakeshoes and the disk.

An ancillary object of the invention is to provide a braking apparatus which is particularly suited for use in rail-mounted vehicles and which can be reset in a time-saving operation when the one and/or the other lining is to be replaced with a fresh lining.

The improved self-adjusting braking apparatus comprises a rotary member (e.g., a disk or the wheel of a rail-mounted vehicle), a pair of brakeshoes movable toward and away from engagement with opposite sides of the rotary member and having linings which can engage liners at the respective sides of the rotary member, a first lever having one end preferably articulately connected to one of the shoes and another end pivotable about a fixed axis which is defined by the frame of the vehicle, a second lever having one end preferably articulately connected with the other shoe and another end which moves with reference to the other end of the first lever in response to application of a braking force which can be furnished by a hydraulic or pneumatic cylinder, an adjustable coupling device or bridge of infinitely variable length which is articulately connected to intermediate portions of the two levers so that the levers can pivot with reference to two relatively movable coupling members of the coupling device in response to application of the braking force to thereby move the respective shoes toward engagement with the rotary member, and adjusting means which is operative to reduce the length of the coupling device (i.e., the distance between the intermediate portions of the levers) when the distance between the other ends of the two levers reaches a predetermined value during application of the braking force. Such displacement of the other end of the second lever relative to the other end of the one lever beyond (above or below) the predetermined distance is indicative of wear on one or both linings and a shortening of the coupling device compensates for such wear.

The novel features which are considered as characteristic of the invention are set forth in particular in the appended claims. The improved braking apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic plan view of a self-adjusting braking apparatus which embodies one form of the invention;

FIG. 2 is a plan view of a slightly modified braking apparatus; and

FIG. 3 is an enlarged axial sectional view of the novel infinitely adjustable coupling device as seen in the direction of arrows from the line III—III of FIG. 2.

DESCRIPTION OF THE PREFERRED EMBODIMENTS

FIG. 1 illustrates a self-adjusting braking apparatus which includes a rotary member here shown as a disk 11 which is mounted on the axle of a vehicle, for example, on the axle of a railroad car. The disk 11 can constitute the wheel of a vehicle. The sides of the disk 11 are provided with two ring-shaped liners 11a, 11b which are respectively adjacent to brakeshoes 12, 13. These brakeshoes are preferably suspended on the frame of the vehicle. The improved linkage which can move the linings of brakeshoes 12, 13 toward and away from frictional engagement with the liners 11a, 11b comprises a first lever 14 one end of which is pivotally connected to the frame of the vehicle (as at 15) to turn about a fixed axis, and the other end of which is pivotally connected to the brakeshoe 12. A second lever 16 of the linkage is articulately connected with the brakeshoe 13 at one end and has a second end remote from the brakeshoe 13 and adapted to be subjected to the action of a braking force P acting in a direction to pivot the lever 16 clockwise, as viewed in FIG. 1. Such braking force can be furnished by a hydraulic or pneumatic cylinder. The levers 14, 16 have intermediate portions which are articulately connected to a coupling device or bridge 17 of infinitely adjustable length. A third lever 18 which forms part of an adjusting device for the bridge 17 is articulately connected to the brakeshoe 13 and lever 16 at one end and to the frame at the other end (as shown at 19) so that it can turn about a fixed axis. The bridge 17 is provided with a projection 20 which can engage an anvil or abutment 21 on an intermediate portion of the third lever 18. When the braking apparatus is idle, there exists at least some clearance or gap between the projection 20 and anvil 21. The width of this gap determines the play of the braking apparatus. The projection 20 is biased outwardly, i.e., toward the anvil 21, in a manner to be described in greater detail in connection with FIG. 3 and serves as a means for triggering a change in effective length of the bridge 17.

The operation

If the lining of the brakeshoe 12 has been subjected to extensive wear, the application of braking force P in the direction indicated by arrows and the ensuing pivotal movement of lever 16 in a clockwise direction, as viewed in FIG. 1, results in movement of the brakeshoe 13 toward and into engagement with the liner 11b of the disk 11. The lever 16 thereupon continues to pivot in a clockwise direction whereby it entrains the lever 14 by way of the bridge 17 until the worn lining of the brakeshoe 12 reaches and frictionally engages the liner 11a. Since the lining of the brakeshoe 12 is worn, the projection 20 of the bridge 17 reaches the anvil 21 on the third lever 18. Further pivotal movement of the lever 16 in a clockwise direction results in a depression of the projection 20 and thereby causes a reduction in effective length of the bridge 17. All this takes place before the lining of the brakeshoe 12 engages the liner 11a. Depression of the projection 20 begins when the aforementioned clearance or gap between the projection and anvil 21 is reduced to zero and while the lever 16 continues to pivot in a clockwise direction, i.e., while the lining of the brakeshoe 12 moves toward the liner 11a and the distance between the left-hand ends of levers 14, 16 increases beyond a predetermined value. Such reduction in effective length of the bridge 17 insures that the lever 16 must turn through a smaller angle during the next application of braking shoes 12 and that such angular displacement of the lever 16 suffices to bring about satisfactory frictional engagement between the disk 11 and the linings of both brakeshoes. Thus, a shortening of the bridge 17 results in automatic adjustment of the braking apparatus to compensate for wear on the lining of the brakeshoe 12 or 13. During the next-following application of brakeshoes 12, 13, the linings of both shoes engage the corresponding liners 11a, 11b as soon as the gap between the projection 20 and anvil 21 is reduced to zero.

An advantage of the improved braking apparatus is that its efficiency exceeds the efficiency of conventional braking apparatus with adjustable piston rods or with stepwise adjustable coupling devices. This is due to the fact that the brakeshoes 12, 13 receive only such motion which is needed to move them into engagement with the liners of the disk 11. The movement needed for changing the length of the bridge 17 is not shared by the brakeshoes. This insures that the levers 14, 16 need not be moved through angles of excessive magnitude. The improved infinitely adjustable bridge 17 (one embodiment of which will be described in greater detail in connection with FIG. 3) can be installed in existing braking apparatus with minimal alterations in the construction and mode of operation of such apparatus.

The braking apparatus of FIG. 2 is practically identical with the apparatus of FIG. 1, with the single main exception that the lever 18' is bent or curved so as to permit unobstructed application of braking force P to the left-hand end of the lever 16. The force P is preferably transmitted by a linkage which receives motion from a brake cylinder, not shown. The configuration of the lever 16 can be selected in such a way that its left-hand end approaches the left-hand end 15 of the lever 14 during application of the braking force P.

FIG. 3 illustrates a portion of the braking apparatus which is shown in FIG. 2. More particularly, FIG. 3 shows the details of the coupling device or bridge 17. This bridge comprises a pair of relatively movable coupling members one of which constitutes a spindle 30 and the other of which constitutes a hollow carrier 31. One end of the spindle 30 is articulately connected to a pin 14a extending between the two prongs of the adjoining bifurcated intermediate portion of the lever 14. The carrier 31 has a bifurcated end portion which is remote from the pin 14a and whose prongs are coupled, by pins 16a, to adjoining prongs of the bifurcated intermediate portion of the lever 16. The carrier 31 accommodates the projection 20 which extends through its right-hand open end. The projection 20 can be shifted in a direction to the left, as viewed in FIG. 3, against the opposition of a biasing means here shown as a helical spring 33. The extent to which the projection 20 can move outwardly, namely, in a direction to the right, is determined by a stop ring 34 which is fitted into an internal groove of the carrier 31. The inner (left-hand) end portion of the projection 20 is connected with a stop ring 35 which surrounds with clearance an externally threaded portion 36 of the spindle 30. A smooth-surfaced tip 37 of the spindle 30 extends into a female portion of the projection 20 so that the projection serves as a guide for the adjoining part of the spindle. The externally threaded portion 36 of the spindle 30 meshes with a nut 38 a portion of which is rotatable in a sleevelike bearing 39 extending through the left-hand open end of the carrier 31 and having an exposed portion surrounding a portion of the sleeve 30. The bearing 39 has a flange in the left-hand portion of the carrier 31. The nut 38 is connected with a helical torsion spring 40 which tends to rotate the nut in a direction to move axially toward the intermediate portion of the lever 14 until a radial shoulder of the nut engages the adjoining radial shoulder on the flange of the bearing 39. The externally threaded portion 36 of the spindle 30 further meshes with a setting nut 41 which is connected with a second helical torsion spring 42. The latter tends to rotate the nut 41 to move it axially toward the intermediate portion of the lever 14 until the nut 41 engages the stop ring 35 on the projection 20. The nuts 38, 41 are provided with entraining pins 43.

An extension or head 44 of the projection 20 can be moved into engagement with the abutment or anvil here shown as including a screw 46 which is rotatable in an internally threaded holder 45 affixed to the lever 18' (not shown in FIG. 3). The bearing 39 and projection 20 are provided with sealing rings 47 which prevent penetration of dust, moisture or other foreign matter into the interior of the hollow carrier 31. The numeral 48 denotes the clearance or gap between the head 44 of the projection 20 and the tip of the axially adjustable screw 46.

The coupling device or bridge of FIG. 3 functions as follows:

If the clearance increases due to wear on the lining of the brakeshoe 12 or 13, the head 44 of the projection 20 engages the screw 46 during application of the braking force P after the clearance 48 is reduced to zero. The lever 16 continues to move in a direction to the right, as viewed in FIG. 3, whereby the projection penetrates deeper into the carrier 31 and stresses the spring 33. Such axial movement of the projection 20 results in movement of the ring 35 away from the nut 41 (in a direction to the left) so that the latter receives torque from the spring 42 and moves axially of the externally threaded portion 36 toward the bearing 39. Rotation and resulting axial movement of the nut 41 is terminated when its left-hand end face again engages the stop ring 35. Such axial adjustment of the nut 41 takes place during braking so that there is enough time to complete its movement into renewed engagement with the stop ring 35 on the depressed projection 20.

If the braking force P is thereupon reduced, the head 44 of the projection 20 remains in engagement with the screw 46 but the carrier 31 moves in a direction to the left under the action of the spring 33. The bearing 39 shares such movement of the carrier 31 relative to the spindle 30, i.e., it moves in a direction toward the intermediate portion of the lever 14 and away from the nut 38. Consequently, the nut 38 can rotate with reference to the externally threaded portion 36 under the action of spring 40 and moves to the left, namely, into renewed engagement with the flange of the bearing 39. During such rotation of the nut 38, the carrier 31 cannot move with reference to the projection 20 because the latter engages the stop 34. Consequently, the extent of axial movement of the nut 38 is a function of the extent of preceding axial movement of the nut 41. Thus, the reduction in effective length of the bridge 17 corresponds to the extent to which the projection 20 is depressed into the carrier 31 subsequent to elimination of the gap 48. When the application of the braking force P is terminated, the head 44 moves away from the screw 46 to reestablish the gap 48. The width of this gap can be adjusted by rotating the screw 46 with reference to its holder 45.

If the linings of the brakeshoes 12, 13 are totally worn away to such an extent that they require replacement, the bearing 39 is rotated by a tool which engages its exposed left-hand portion. Rotation of the bearing 39 takes place in a direction counter to that in which the nut 38 rotates in order to move toward engagement with the bearing 39. The pins 43 of the nut 38 entrain the nut 41 and the spindle 30 is moved axially of the carrier 31 to reestablish the original maximum axial length of the bridge 17. Upon the first application of brakeshoes with new linings, the effective length of the bridge 17 is automatically adjusted in such a way that the head 44 and screw 46 provide a gap 48 of desired width. Subsequent changes in effective length of the bridge 17 take place automatically in response to progressing wear on the linings in a manner as described above.

It is clear that the improved braking apparatus is susceptible of many modifications without departing from the spirit of the invention. For example, the screw 46 can be fixedly secured to the lever 18 or 18' if the latter's end 19 is adjustable with reference to the frame and hence with reference to the end 15 of the lever 14. This can be achieved by employing a connector which is an eccentric post or bolt so that its rotation with reference to the frame effects the same adjustment as the rotation of screw 46 with reference to its holder 45. It is also possible to change the mounting of the projection 20 in the carrier 31 and to change the manner in which the projection 20 cooperates with the lever 18 or 18' or with an anvil on such lever. The spring 33 can be replaced by a spring which is expanded in response to penetration of the projection 20 into the carrier 31. Also, the left-hand ends 15, 19 of the levers 14, 18 or 14, 18' can be mounted for pivotal movement about a common axis.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

1. Self-adjusting braking apparatus, particularly for use in rail-mounted vehicles, comprising a rotary member; a pair of brakeshoes movable toward and away from engagement with opposite sides of said rotary member; a first lever having one end connected to one of the shoes and another end pivotable about a fixed axis; a second lever having one end connected to the other shoe and another end arranged to move with reference to the other end of said first lever in response to application of a braking force; an adjustable coupling device of infinitely variable length articulately connected with intermediate portions of said levers so that the levers can pivot with reference to the coupling device in response to application of the braking force to thereby move the respective shoes toward engagement with said rotary member; and adjusting means operative to reduce the length of said coupling device when the distance between the other ends of said levers reaches a predetermined value during application of the braking force.

2. Self-adjusting braking apparatus as defined in claim 1, wherein said adjusting means comprises a third lever having one end connected to said other shoe and another end turnable about a predetermined axis, and an abutment provided on said third lever in the path of movement of said coupling device during application of braking force to the other end of said second lever.

3. Self-adjusting braking apparatus as defined in claim 2, wherein said coupling device comprises carrier means and a projection which is normally spaced from said abutment and is displaced with reference to said carrier means in response to engagement with said abutment during movement of the other end of said second lever relative to the other end of said first lever beyond said predetermined distance.

4. Self-adjusting braking apparatus as defined in claim 2, wherein said third lever is curved.

5. Self-adjusting braking apparatus as defined in claim 2, wherein said predetermined axis for the other end of said third lever is adjustable with reference to said fixed axis.

6. Self-adjusting braking apparatus as defined in claim 2, wherein the other ends of said first and third levers are turnable about a common axis.

7. Self-adjusting braking apparatus as defined in claim 1, wherein the one end of each of said levers is articulately connected with the respective shoe.

8. Self-adjusting braking apparatus as defined in claim 1, wherein said adjusting means comprises an abutment which is adjustable with reference to said coupling means.

9. An adjustable coupling device of variable length, particularly for connecting the levers for brakeshoes in a braking apparatus, for rail-mounted vehicles, comprising a first coupling member constituting a hollow carrier having two ends, a projection reciprocably received in said first coupling member and extending from one end thereof, a second coupling member reciprocable with reference to said first coupling member and said projection, said second coupling member extending through the other end of said first coupling member and comprising an externally threaded portion in the interior of said first coupling member, and means for moving one of said coupling members with reference to the other coupling member to thereby change the combined length of said coupling members in response to movement of said projection with reference to said first coupling member, said means for moving comprising a pair of nuts meshing with said externally threaded portion and torsion springs for rotating said nuts with reference to said externally threaded portion in response to movement of said projection toward the other end of said first coupling member.

10. An adjustable coupling device of variable length, particularly for connecting the levers for brakeshoes in a braking apparatus for rail-mounted vehicles, comprising a first coupling member constituting a hollow carrier having two ends, a projection reciprocably received in said first coupling member and extending from one end thereof, a second coupling member reciprocable with reference to said first coupling member and said projection, said second coupling member extending through the other end of said first coupling member and comprising an externally threaded portion in the interior of said first coupling member, and means for moving one of said coupling members with reference to the other coupling member to thereby change the combined length of said coupling members in response to movement of said projection with reference to said first coupling member, said means for moving comprising a pair of nuts meshing with said externally threaded portion and means for rotating said nuts with reference to said externally threaded portion in response to movement of said projection toward the other end of said carrier, said projection comprising stop means located between said nuts and arranged to terminate rotary movement of one of said nuts in response to movement of said projection toward the other nut.

11. A coupling device as defined in claim 9, further comprising means for biasing said projection away from the other end of said first coupling member.

12. A coupling device as defined in claim 10, wherein said stop means comprises a ring.

13. A coupling device as defined in claim 9, further comprising an annular bearing mounted in said carrier adjacent to one of said nuts, said bearing having a portion extending through the other end of said carrier and surrounding a portion of said second coupling member.

14. A coupling device as defined in claim 9, further comprising means provided in said carrier for biasing said projection away from said other end and means for limiting the extent of movement of said projection under the action of said biasing means.

15. A coupling device as defined in claim 2, wherein at least one of said nuts is provided with entraining means for rotating the other nut in response to rotation of said one nut.

16. An adjustable coupling device of variable length, particularly for connecting the levers for brakeshoes in a braking apparatus for rail-mounted vehicles, comprising a first coupling member constituting a hollow carrier having two ends, a projection reciprocably received in said first coupling member and extending form one end thereof, a second coupling member reciprocable with reference to said first coupling member and said projection, said second coupling member extending through the other end of said first coupling member and comprising an externally threaded portion in the interior of said first coupling member, said projection comprising a female portion and said second coupling member further comprising an end portion reciprocably extending into said female portion, and means for moving one of said coupling members with reference to the other coupling member to thereby change the combined length of said coupling members in response to movement of said projection with reference to said first coupling member, said means for moving comprising a pair of nuts meshing with said externally threaded portion and means for rotating said nuts with reference to said externally threaded portion in response to movement of said projection toward the other end of said first coupling member.

17. An adjustable coupling device of variable length, particularly for connecting the levers for brakeshoes in a braking apparatus for rail-mounted vehicles, comprising a first coupling member constituting a hollow carrier having two ends, a projection reciprocably received in said first coupling member and extending from one end thereof, a second coupling member reciprocable with reference to said first coupling member and said projection, said second coupling member extending through the other end of said first coupling member and comprising an externally threaded portion in the interior of said first coupling members, means for moving one of said coupling members with reference to the other coupling member to thereby change the combined length of said coupling members in response to movement of said projection with reference to said first coupling member, said means for moving comprising a pair of nuts meshing with said externally threaded portion and means for rotating said nuts with reference to said externally threaded portion in response to movement of said projection toward the other end of said first coupling member, an annular bearing mounted in said first coupling member adjacent to one of said nuts and having a portion extending through said other end of said first coupling member and surrounding a portion of said second coupling member, and sealing means interposed between said projection and said first coupling member.

18. A coupling device as defined in claim 2, wherein said nuts are arranged to move toward the other end of said carrier in response to movement of said projection in the same direction.

19. A coupling device as defined in claim 2, further comprising means for biasing said projection to an outer end position and wherein said nuts are rotatable in a direction toward said other end of the carrier, the latter comprising stop means engaging one of said nuts upon movement of said carrier and said second coupling member in opposite directions to permit movement of said one nut away from said stop means whereby the one nut is free to rotate with reference to said externally threaded portion to return into abutment with said stop means.

* * * * *